United States Patent

[11] 3,609,262

[72] Inventor John E. Hotchkiss
 Corte Madera, Calif.
[21] Appl. No. 824,215
[22] Filed May 13, 1969
[45] Patented Sept. 28, 1971
[73] Assignee Hotchkiss Instruments, Inc.
 Continuation-in-part of application Ser. No. 755,661, Aug. 27, 1968.

[54] NECK-CARRIED BATTERY PACK
 8 Claims, 2 Drawing Figs.
[52] U.S. Cl................................................ 200/52,
  200/DIG. 2
[51] Int. Cl................................................ H01h 35/00
[50] Field of Search.......................................... 200/52, 60;
  136/173; D2/352; D48/20.4, 25; 240/6.4

[56] References Cited
 UNITED STATES PATENTS
1,211,976 1/1917 Spencer et al. ............... 200/52 (BA)
1,307,456 6/1919 Prahar.......................... 200/60 UX
1,402,609 1/1922 Hodous....................... 200/52 (BA)
2,361,414 10/1944 Ramsey................... 240/6.4
2,697,128 12/1954 Moore......................... 136/173
2,747,038 5/1956 Perkovich ................. 200/52 (BA)
2,842,628 7/1958 James.......................... 200/52
3,089,071 5/1963 Hartwig...................... 136/173 X
3,227,948 1/1966 Cheshire ..................... 200/60 X Primary Examiner—J. R. Scott
Attorney—Warren, Rubin, Brucker & Chickering ABSTRACT: A lightweight battery pack adapted to be worn around a user's neck for detachable connection to and powering of a portable electric instrument and being characterized by a pair of battery receptacles secured together in spaced relation by an electrical cord for placement around the user's neck to support the battery receptacles on laterally opposite sides thereof forward of the user's shoulders. The battery receptacles are preferably provided with electrical contacts formed to connect the batteries to produce an electrical circuit in which current will flow with predetermined polarity only upon positioning of the batteries in a predetermined relative orientation.

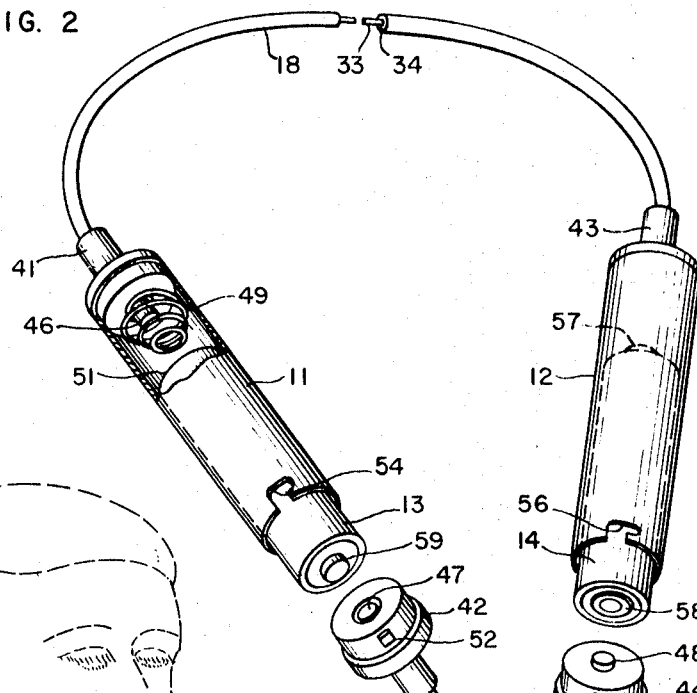
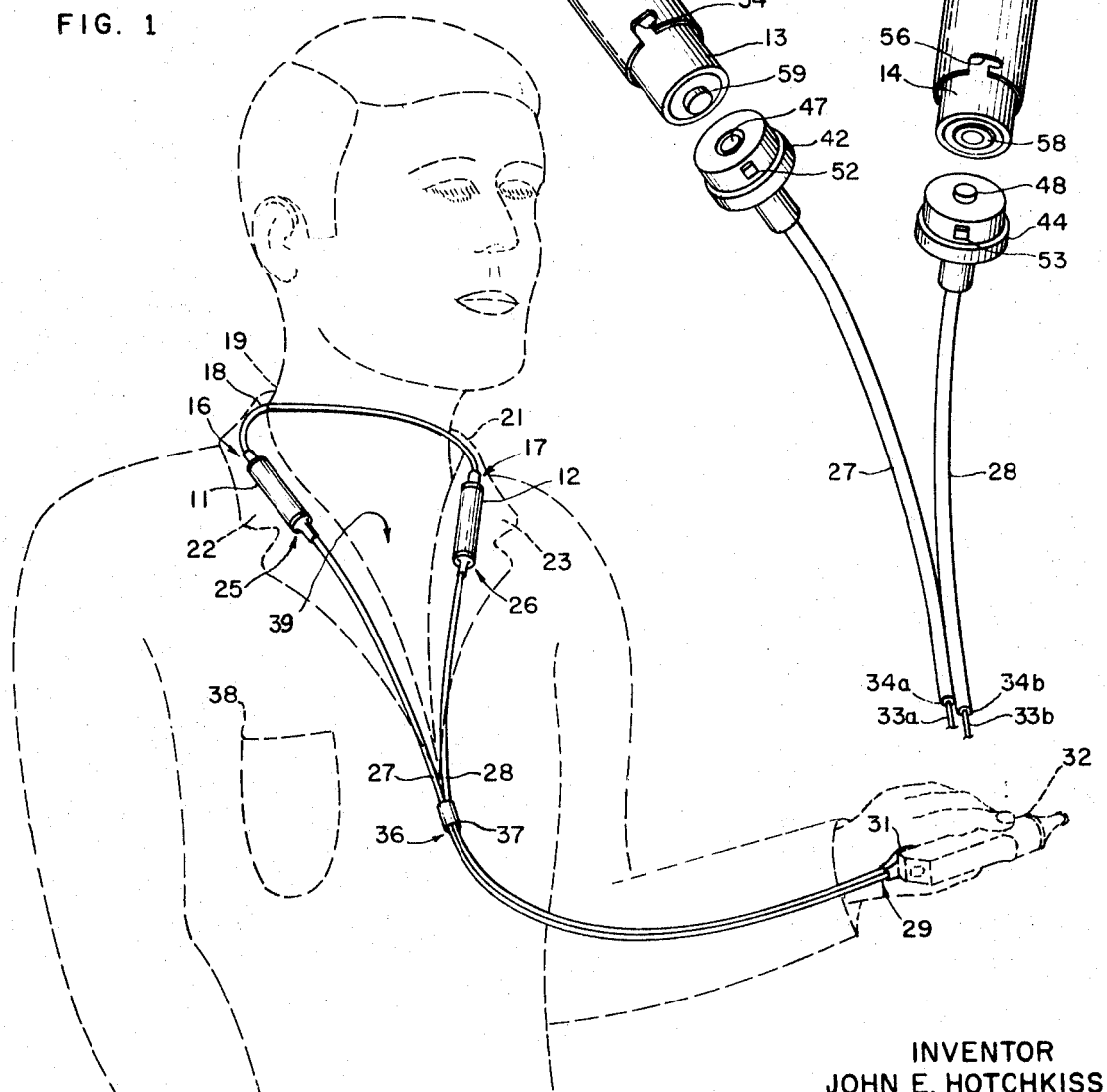

NECK-CARRIED BATTERY PACK

The present application is a continuation-in-part of U.S. Pat. application Ser. No. 755,661, filed Aug. 27, 1968.

It is often desirable in the use of manually carried and manipulated portable electric instruments to provide a battery source as a separate unit from the instrument and which may be carried on the body of the user for convenient electrical attachment and detachment with the instrument. In this manner the weight and size of the instrument are substantially reduced for easier manipulation thereof which is particularly desirable in the case of precision medical light source probes such as an endoscope. Furthermore, carriage of the battery source or pack in this manner permits a wide variety of different devices to be attached to and powered by the same battery source while the latter remains at all times conveniently secured to the user's body and readily at hand. It is further of significant advantage to have a portable battery source which is easily and conveniently rechargeable.

It is an object of the present invention to provide such a battery pack which is adapted to be worn around the user's neck and may be easily and rapidly taken on and off therefrom and which will cling to the user's body when worn so as not to interfere with and encumber his activity.

A further object of the present invention is to provide a neck-carried battery pack which is suitable for use with instruments requiring a preselected polarity of the electrical circuit.

Still a further object of the present invention is to provide a neck-carried battery pack which is rechargeable and cannot be inadvertently discharged.

A further object of the present invention is to provide such a neck-carried battery pack which may be readily constructed with a small number of durable parts for economic mass manufacture and long trouble free life.

The invention possesses other objects and features of advantage. Some of the foregoing features will be set forth in the following description of the preferred form of the invention which is illustrated in the drawing accompanying and forming a part of the specification. It is to be understood, however, that variations in the showing made by the drawing and description may be adopted within the scope of the invention.

In the drawing:

FIG. 1 is a perspective view of the neck-carried battery pack constructed in accordance with the present invention and showing the manner in which it is worn by the user; and FIG. 2 is an assembly view of the battery pack shown in FIG. 1 having portions cut away for clarity.

With reference to FIG. 1, the neck-carried battery pack in its presently preferred construction comprises a pair of elongate cylindrical battery receptacles 11 and 12, each adapted for receiving a Pen-Cell battery such as batteries 13 and 14 as shown in FIG. 2, and wherein the receptacles are electrically and mechanically secured at axial ends 16 and 17 thereof to an elongate electrical conductor 18. In this instance and as preferred, conductor 18 provides a flexible linkage means connected to and between receptacles 11 and 12 and having a length suitably selected for extending around the back portions of the user's neck 19 and supporting receptacles 11 and 12 on the forward and laterally opposite sides of the neck generally forward of the user's shoulders. By virtue of this arrangement, the weight of receptacles 11 and 12 equipped with batteries 13 and 14 therein tends to create a slight tensional force which is almost imperceptible to the user but sufficient to maintain conductor 18 snugly against the back of the neck thereby stabilizing the position of the receptacles (as shown in the drawing) particularly during rapid movement of the user. In this regard, the most satisfactory arrangement is to have the longitudinal axes of receptacles 11 and 12 rest along the user's collar bone (not shown) adjacent the front sides of the neck. By this disposition, conductor 18 may be placed under collar 21 and the receptacles conveniently arranged out of sight under lapels 22 and 23 of the user's garment to further secure the battery pack to the body and prevent dangling of the receptacles during activity of the user.

Axial ends 25 and 26 of receptacles 11 and 12 projecting generally downwardly from laterally and forward sides of the user's neck are provided with electrical and mechanical connections to conductors 27 and 28 which have extended end portions indicated at 29 connected to a swivel connector 31. Connection 31 is in turn adapted for detachable connection to a portable battery-powered instrument 32, in this instance shown by phantom lines as an endoscope 32 of the type including a bulb light source therein. The length of conductors 27 and 28 is selected to provide a suitable amount of free movement of instrument 32 relative to receptacles 11 and 12 positioned as shown on the user's body. The construction of swivel connector 32 and the mechanical and electrical cooperation thereof with instrument 32 and described in detail in the above-noted U.S. Pat. Application Ser. No. 755,661.

Conductors 18, 27 and 28 are preferably comprised of a single conducting wire 33 having a flexible insulating sheath 34 as shown in FIG. 2 and may be viewed as a single elongate conductor in which receptacles 11 and 12 are mechanically and electrically interposed at spaced, intermediate longitudinal positions thereon coaxially and in electrical series therewith. The extended conductor end portions provided by conductors 27 and 28 are preferably merged as indicated at 36 and the insulating sheaths 34a and 34b thereof bonded along the length of the conductors to form a unitary cord between connector 31 and a point of bifurcation indicated at reference numeral 36. A suitably formed clasp 37 is provided to prevent separation of the bonded sheaths. By this arrangement an open loop 39 is formed, which includes conductor 18 and portions of conductors 27 and 28 and has receptacles 11 and 12 arranged at spaced positions thereon. The size of loop 39 is suitably adjusted so as to readily pass over the user's head for quick donning and removal of the neck pack. When the battery source is being carried by the user but is not in actual use, swivel connector 31 is detached from instrument 32 and disposed out of the way as by placing it in a breast pocket 38 or when size permits, the instrument together with the attached swivel connector may be carried in the pocket.

The mechanical and electrical series connection of receptacles 11 and 12 with conductors 18, 27 and 28 is provided by end caps 41, 42, 43 and 44 as shown in FIG. 2. Each end cap is provided with an electrical contact coaxially set therein, such as contacts 46, 47 and 48 for caps 41, 42 and 44, respectively, which are electrically engaged with conducting wires 33. Each of end caps 41 and 43 is provided with a helical electrically conducting spring, shown for end cap 41 as spring 49 adapted to engage an electrical end contact 51 of battery 13. In this instance, end caps 41 and 43 are coaxially and permanently secured by suitable means to the ends of receptacles 11 and 12.

End caps 42 and 44 on the other hand, are provided with means for removable attachment to the associated ends of receptacles 11 and 12, in this instance being provided by bayonet fittings 52 and 53 adopted to enter L-shaped slots 54 and 56 and to lock therein by rotation of end caps 42 and 44 clockwise with respect to the receptacles. In accordance with the electrical series connection above described, batteries 13 and 14 are disposed in opposing polarity orientation within receptacles 11 and 12. In this instance, battery 14 is disposed with its positive terminal 59 adjacent end cap 43 and with the negative end contact 58 adapted for engaging contact 48 of end cap 44. Battery 13 is arranged with its negative end contact 51 for engagement with contact spring 49 and its positive end contact 59 for engagement with contact 47 of cap 42 such that the potentials of batteries 13 and 14 add to provide a voltage across conductors 33a and 33b twice that of each individual battery. This potential is extended through conductors 27 and 28 and swivel connector 31 to and for powering instrument 32.

It is an important feature of the device of the present invention to provide a neck-carried battery pack construction which can be easily employed with a variety of instruments and can be conveniently recharged. Many instruments, such as the endoscope illustrated in the drawing, merely require a battery source which provides potential or voltage across conductors 33a and 33b, with the polarity of this voltage being of no particular importance in powering the light source. Some instruments, however, may require a particular polarity of the batteries in order to insure proper operation of or avoid damage to the instrument. A related problem exists when batteries 13 and 14 are selected to be of a rechargeable type, in which case a charging source (not shown) may be applied, periodically as needed, across conductors 27 and 28 through an electrical connection with swivel connector 31. Many recharging apparatus are formed to have a fixed polarity, and if connected to batteries 13 and 14 improperly, the recharger will discharge the batteries.

While rechargers may have a fixed polarity at the output and certain instruments have a fixed polarity at the input, connector 31 and the output or input can be formed in a manner which always results in connectors 27 and 28 being electrically connected in a certain predetermined polarity to the instrument or recharger. Thus, if coaxial pivot shaft and plate arrangement is employed, as described in detail in U.S. Pat. Application No. 755,661, the pin may be electrically connected to the positive side of the instrument or recharger and conductor 27, and the place may be electrically connected to the negative side of the instrument or recharger and conductor 28. Thus, the polarity at end caps 42 and 44 can be fixed by design of connector 31 and the input and output of the devices to be electrically connected thereto.

It is, however, an important feature of the battery pack of the present invention that the batteries can be easily inserted into and removed from the receptacles 12 and 13, as may be periodically required. This insertion and removal of batteries may well result in an orientation of the batteries in the receptacles which would be of opposite polarity as the polarity at end caps 42 and 44. Thus, if batteries 13 and 14 were both reversed and replaced in their respective receptacles, there would still exist a voltage across contacts 58 and 59, which would be suitable for powering a light. This voltage, however, might be of opposite polarity to that for which the device electrically connected to connector 31 was designed. The same result would occur if end cap 44 was secured to receptacle 11 and end cap 42 was secured to receptacle 12.

In order to avoid orienting batteries 13 and 14 with an improper polarity, the end caps forming part of the receptacles of the present invention are formed to electrically connect the batteries with a voltage across the conductor 27 and 28 with only one predetermined polarity. This is achieved by forming one contact, in this instance contact 47, as a recess in the end cap, which recess is dimensioned to receive a positive terminal of a battery. The other contact, in this instance contact 48, is formed as a protrusion to insure that it will make electrical connection with a negative battery terminal. Thus, if batteries 13 and 14 are reversed, contact 47 will not make an electrical connection with end 51 of battery 13 and the circuit will be open, preventing discharge by a recharger or damage to an instrument. If end caps 42 and 44 are reversed, contact 47 will not make an electrical contact with end terminal 58 of battery 14. It would be possible to reverse battery 14 only and still have an electrical circuit, but in this orientation there would be no voltage across conductors 27 and 28, since the batteries would oppose each other. Thus, the novel design of receptacle components prevents all but one of the four possible orientations of batteries from forming an operative circuit and thereby eliminates the dangers of incorrect battery removal and replacement.

I claim:

1. A pair of battery receptacles adapted for receiving and retaining batteries therein, flexible linkage means including an electrical conductor connected to and between said receptacles having a length selected for extending around the user's neck and supporting said receptacles on laterally opposite sides of the neck forward of the user's shoulders,
   means electrically connecting said electrical conductor to said receptacles and electrically connecting said receptacles to the instrument, and
   each of said receptacles including a pair of battery contacts, said contacts being electrically connected to said means and one of said contacts being formed to allow electrical connection of batteries only upon positioning of the batteries in said receptacles in a manner wherein current flow in the circuit formed by said contacts will be of a predetermined polarity.

2. The battery pack defined in claim 1, wherein
said receptacles are formed to have an elongate shape and are adapted to receive similarly shaped batteries therein, and said linkage means is connected to one axial end of each said receptacle whereby the longitudinal axes of said receptacles extend generally downwardly from opposite sides of the neck and may be placed under the lapels of a user's garment.

3. The pack defined in claim 1, wherein
said conductor is said linkage means.

4. The pack defined in claim 3, wherein
said conductor is an elongate insulated electrically conducting wire and said receptacles are mechanically connected at spaced intermediate positions thereon and connected in electrical series therewith.

5. The pack defined in claim 4, wherein
said receptacles are formed to have an elongate shape adapted for receiving similarly shaped batteries therein, and said conductor is connected to axially opposite ends of each said receptacle such that the longitudinal axes of said receptacles extend generally downwardly from laterally opposite sides of the user's neck and may be placed under the lapels of a user's garment and end portions of said conductor extending from the lower ends of said receptacles for connection to the instrument.

6. The pack defined in claim 5, wherein
said conductor end portions are mechanically secured together to arrange said conductor in a loop containing said receptacles, said loop being large enough to pass over the user's head for placement around the neck and removal therefrom.

7. The battery pack as defined in claim 1, wherein
said battery pack is formed for use with elongate batteries having electrical terminals at opposite ends thereof with one of said terminals being formed as a protrusion from said battery and the terminal at said opposite end being formed as a flat member, and wherein
at least one of said contacts is disposed in a recess in said receptacle and said contact and recess are formed and dimensioned to receive and make electrical connection with said protruding terminal, said contact and recess being further formed to prevent electrical connection with said flat terminal.

8. The battery pack as defined in claim 1, wherein
a pair of said contacts are disposed in removable end caps, said end caps being formed to be releasably secured to said receptacles, and said recessed contact is disposed in one end cap and a second contact is disposed in the other end cap, said second contact being formed as a protrusion for engagement of and electrical connection with said flat terminal of said battery.

UNITED STATES PATENT OFFICE
CERTIFICATE OF CORRECTION

Patent No. 3,609,262                       Dated September 28, 1971

Inventor(s) John E. Hotchkiss

It is certified that error appears in the above-identified patent and that said Letters Patent are hereby corrected as shown below:

Column 2, line 6, "Connection 31" should read -- Connector 31 --. Column 4, line 1, before "A pair" insert -- A battery pack to be worn around a user's neck for attachment to and for powering a portable electrical instrument, comprising: --.

Signed and sealed this 29th day of August 1972.

(SEAL)
Attest:

EDWARD M. FLETCHER, JR.                ROBERT GOTTSCHALK
Attesting Officer                      Commissioner of Patents